US012717670B2

(12) United States Patent
Xiong et al.

(10) Patent No.: US 12,717,670 B2
(45) Date of Patent: Aug. 25, 2026

(54) ERROR MONITORING SCHEMES USING ALIVENESS RECORD OF THREAD

(71) Applicant: TuSimple, Inc., San Diego, CA (US)

(72) Inventors: Jinshan Xiong, San Diego, CA (US); Chaojie Deng, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 0 days.

(21) Appl. No.: 18/949,247

(22) Filed: Nov. 15, 2024

(65) Prior Publication Data

US 2025/0165328 A1 May 22, 2025

Related U.S. Application Data

(60) Provisional application No. 63/601,132, filed on Nov. 20, 2023.

(51) Int. Cl.
*G06F 11/00* (2006.01)
*G06F 11/07* (2006.01)
*G06F 11/26* (2006.01)

(52) U.S. Cl.
CPC ...... *G06F 11/0772* (2013.01); *G06F 11/0757* (2013.01); *G06F 11/261* (2013.01)

(58) Field of Classification Search
CPC . G06F 11/0772; G06F 11/0757; G06F 11/261
See application file for complete search history.

(56) References Cited

U.S. PATENT DOCUMENTS

| | | | | |
|---|---|---|---|---|
| 7,954,094 | B2 * | 5/2011 | Cascaval ............. | G06F 9/45516 717/145 |
| 10,318,475 | B2 | 6/2019 | Kaimalettu et al. | |
| 11,178,091 | B1 | 11/2021 | Madhavan et al. | |
| 11,644,834 | B2 | 5/2023 | Ditty et al. | |
| 2006/0200331 | A1 | 9/2006 | Bordes | |
| 2014/0281720 | A1 | 9/2014 | Gupta et al. | |
| 2015/0063100 | A1 | 3/2015 | Archer et al. | |
| 2021/0200603 | A1 | 7/2021 | Battiprolu et al. | |
| 2023/0146364 | A1 | 5/2023 | Cui et al. | |
| 2024/0272977 | A1 * | 8/2024 | Abdelhameed ....... | G06F 9/4887 |

FOREIGN PATENT DOCUMENTS

CN 103744723 B 4/2014

* cited by examiner

*Primary Examiner* — Jason B Bryan
(74) *Attorney, Agent, or Firm* — Ashurst Perkins Coie US LLP

(57) ABSTRACT

Described are devices, systems and methods for monitoring a health status of a thread. A method of monitoring a health status of a thread comprises: invoking a callback for the thread to write a begin record and an end record in an aliveness record that corresponds to the thread, the aliveness record being stored in a memory; detecting an unhealthy status of the thread by reading the aliveness record from the memory; and reporting the unhealthy status of the thread in response to the detecting.

19 Claims, 6 Drawing Sheets

ERROR MONITORING SCHEMES USING ALIVENESS RECORD OF THREAD

CROSS-REFERENCE TO RELATED APPLICATIONS

This document claims priority to and the benefit of U.S. Provisional Application No. 63/601,132, filed on Nov. 20, 2023. The aforementioned application of which is incorporated herein by reference in its entirety.

TECHNICAL FIELD

This document relates to tools (systems, apparatuses, methodologies, computer program products, etc.) for semi-autonomous and autonomous control of vehicles

BACKGROUND

Autonomous vehicle navigation can have important applications in the transportation of people, goods, and services. In order to ensure the safety of the vehicle, as well as people and property in the vicinity of the vehicle, various applications are being employed by the vehicle to process various measurement data and provide information for drivers of the vehicle.

SUMMARY

Disclosed are devices, systems and methods for error monitoring schemes using aliveness record of thread. A thread refers to a basic unit of execution in a computer process. Each process thread includes instructions for a computer processor to execute in a sequence.

In one aspect, a method of monitoring a health status of a thread is provided. The method comprises: invoking a callback for the thread to write a begin record and an end record in an aliveness record that corresponds to the thread, the aliveness record being stored in a memory; and detecting an unhealthy status of the thread by reading the aliveness record from the memory; and reporting the unhealthy status of the thread in response to the detecting.

In another aspect, a system of monitoring a health status of a thread is provided. The system comprises: a pre-callback register configured to register a pre-callback before an execution of a callback, wherein the pre-callback is configured to write a begin record in an aliveness record of the thread; a post-callback register configured to register a post-callback after the execution of the callback, wherein the post-callback is configured to write an end record for the thread; a memory storing an aliveness information for the thread that includes a begin timestamp and an end timestamp corresponding to the begin record and the end record, respectively; an aliveness record checker configured to read the aliveness record from the memory and detect an unhealthy status of the thread based on the aliveness record.

In another aspect, a computer-readable storage medium is provided. The computer-readable storage medium has code stored thereon, the code, upon execution by one or more processors, causing the one or more processors to implement a method comprising: invoking a callback for a thread to write a begin record and an end record in an aliveness record that corresponds to the thread, the aliveness record being stored in a memory; and detecting an unhealthy status of the thread by reading the aliveness record from the memory; and reporting the unhealthy status of the thread in response to the detecting.

The above and other aspects and features of the disclosed technology are described in greater detail in the drawings, the description and the claims.

DETAILED DESCRIPTION

Various implementations of the disclosed technology relate to techniques for detecting and mitigating error conditions in various implementations executing multiple processes that use multiple threads to perform various operations.

Multithreading is a model of program/process execution that allows for multiple threads to be created within a process, executing independently but concurrently sharing process resources. Depending on the hardware, threads can run fully parallel. The threads are incorporated into an application to improve its performance. For example, a web server will utilize multiple threads to simultaneous process requests for data at the same time. An image analysis algorithm will generate multiple threads at a time and segment an image into quadrants to apply filtering to the image. Multithreading also can lead to minimization and more efficient use of computing resources. In addition, the multithreading is less resource-intensive than running multiple processes at the same time. There is much more overhead, time consumption, and management involved in creating processes as compared to creating and managing threads.

Despite various advantages of using multiple threads, they add complexity and can create errors. One challenge for detecting error conditions is faced by different runtimes of multiple processes/threads. When different processes/threads have different run times, it becomes more difficult to detect dead/zombie threads, which results in the failure of mitigating the risk caused due to such dead processes/threads. There have been approaches to detect the dead/zombie threads. For example, conventional solutions use time stamps within the code being executed to keep track of a timeline of each thread. However, with different run times for different threads, it is difficult to figure out whether a particular thread is still alive or has prematurely died or is hanging.

Various implementations of the disclosed technology provide error monitoring schemes for multi-threaded real-time systems. The suggested error monitoring schemes can be incorporated in an autonomous or semi-autonomous vehicle to detect and mitigate error conditions in processing multiple threads in real time.

Figure 1:
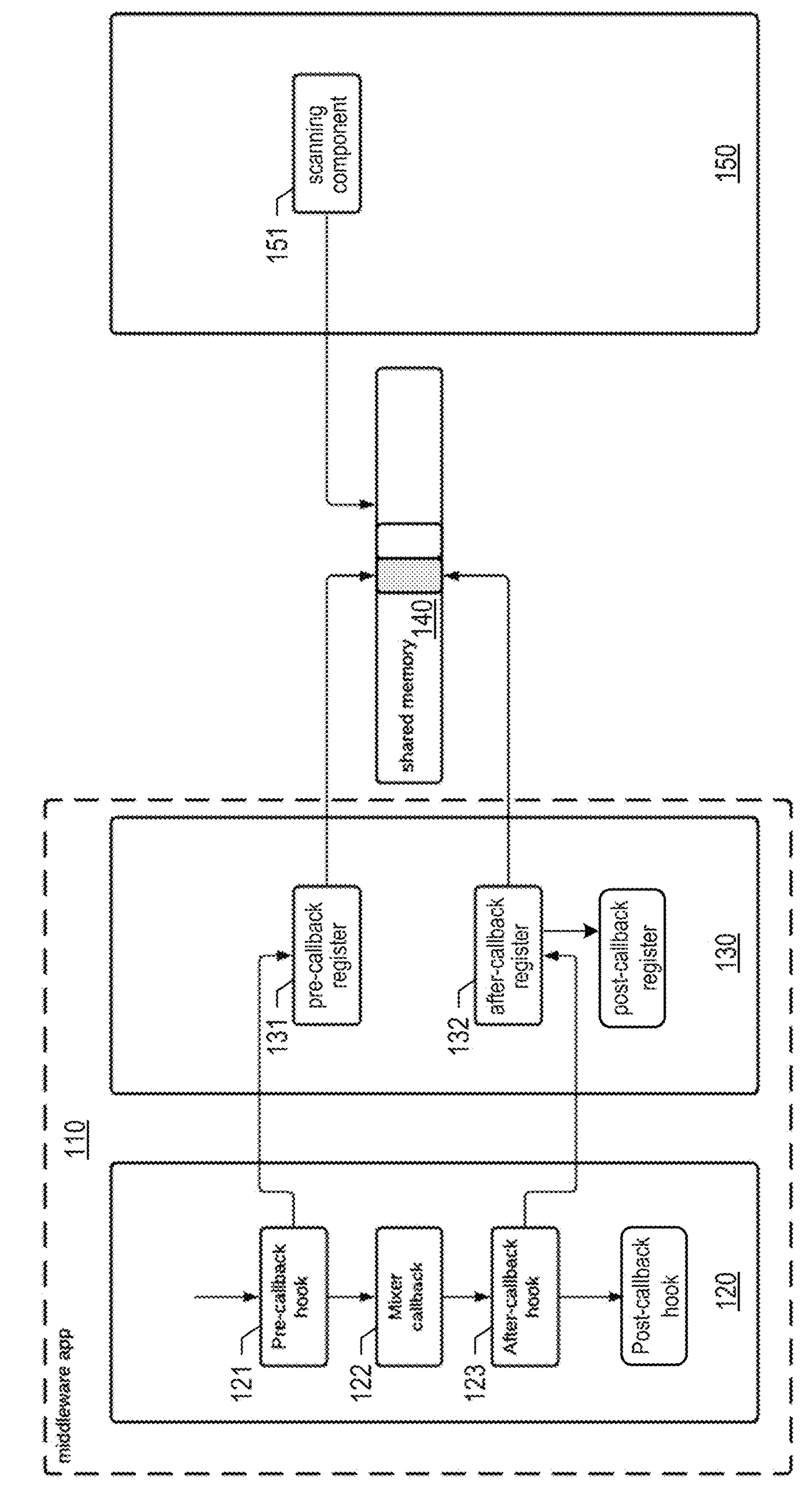
FIG. 1 shows an example of a schematic diagram of a monitoring system based on some implementations of the disclosed technology.

FIG. 1 shows an example diagram illustrating an error monitoring system 100 based on some implementations of the disclosed technology. The error monitoring system 100 may include an error management middleware application 110. The error management middleware application 110 may be loaded into each process of a device associated with the error management middleware application to perform operations and services. The error management middleware application 110 can operate like connective tissue between applications, data, software components, hardware components, users, or others. For example, the error management middleware application 110 can be provided for a vehicle control system including various components, for example, sensor devices. In this case, the error management middleware application 110 may interface with hardware and software components associated with the sensor devices installed in the vehicle and operate to register callbacks as described below.

As shown in FIG. 1, the error management middleware application 110 includes a hook interface 120 and a callback register 130. The hook interface 120 includes a pre-callback hook 121, a mixer callback 122, and a post-callback hook 123. The mixer callback 122 is provided to provide a mechanism to avoid and address issues when a process to be executed by the device associated with the error management middleware application 110 has algorithms relying on multiple topics and those topic subscribers work independently with indefinite latencies. The mixer callback 122 is configured to combine several data streams corresponding to topic messages into one according to predetermined rules and produce a new data stream with combined data. The callback register 130 includes a pre-callback register 131 and a post-callback register 124. The pre-callback register 131 registers a pre-callback function via the pre-callback hook 121 and the post-callback register 132 registers a post-callback function via the post-callback hook 123. The pre-callback function and the post-call back function may be registered via the hook interface 120 when initializing the error management middleware application 110. The pre-callback register 131 registers the pre-callback function before a certain event and the post-callback register 132 registers the post-callback function after the certain event. For example, the certain event may correspond to an actual execution of the callback function. For each cycle of a thread, the hook interface 120 and the callback register 130 operate together to invoke some functions by registering the pre-callback hook 121, execute the callback itself, and then invoke some other functions by registering the post-callback hook 123.

In the implementations, the pre-callback function registered by the pre-callback register 130 writes a begin record in an aliveness record corresponding to a thread and the post-callback function registered by the post-callback register 132 writes an end record in the aliveness record corresponding to the thread. The aliveness record may be stored in a shared memory 140. In some implementations, the shared memory 140 refers to a memory that may be simultaneously accessed by multiple programs/modules/units to provide communication among them or avoid redundant copies. In the example of FIG. 1, the shared memory 140 is accessed by the callback register 130 and the aliveness checker 150. While FIG. 1 shows the single aliveness record in the shared memory 140 for a thread, there can be multiple threads being processed by the error monitoring system 100. In this case, the shared memory 140 may be used to store multiple aliveness records corresponding to multiple threads.

In some implementations, the aliveness record of a thread may contain at least one of the corresponding callback's information, such as an application name, function name, timestamp indicating when a corresponding record is written, process identification (ID), thread identification (ID), or type. When a certain process runs, the process has a process ID associated with it and within each process, there is at least one thread having a thread ID. A thread shares the virtual address space and system resources of each process. The application name and the function name also can be used as the identification information to identify a corresponding thread and/or related application/function. The type of the aliveness record may indicate whether the corresponding record is a begin type which indicates that the corresponding record is written before callback or an end type which indicates that the corresponding record is written after callback. The timestamp difference between the begin record and the end record of a callback execution indicates runtime of the callback.

Figure 2:
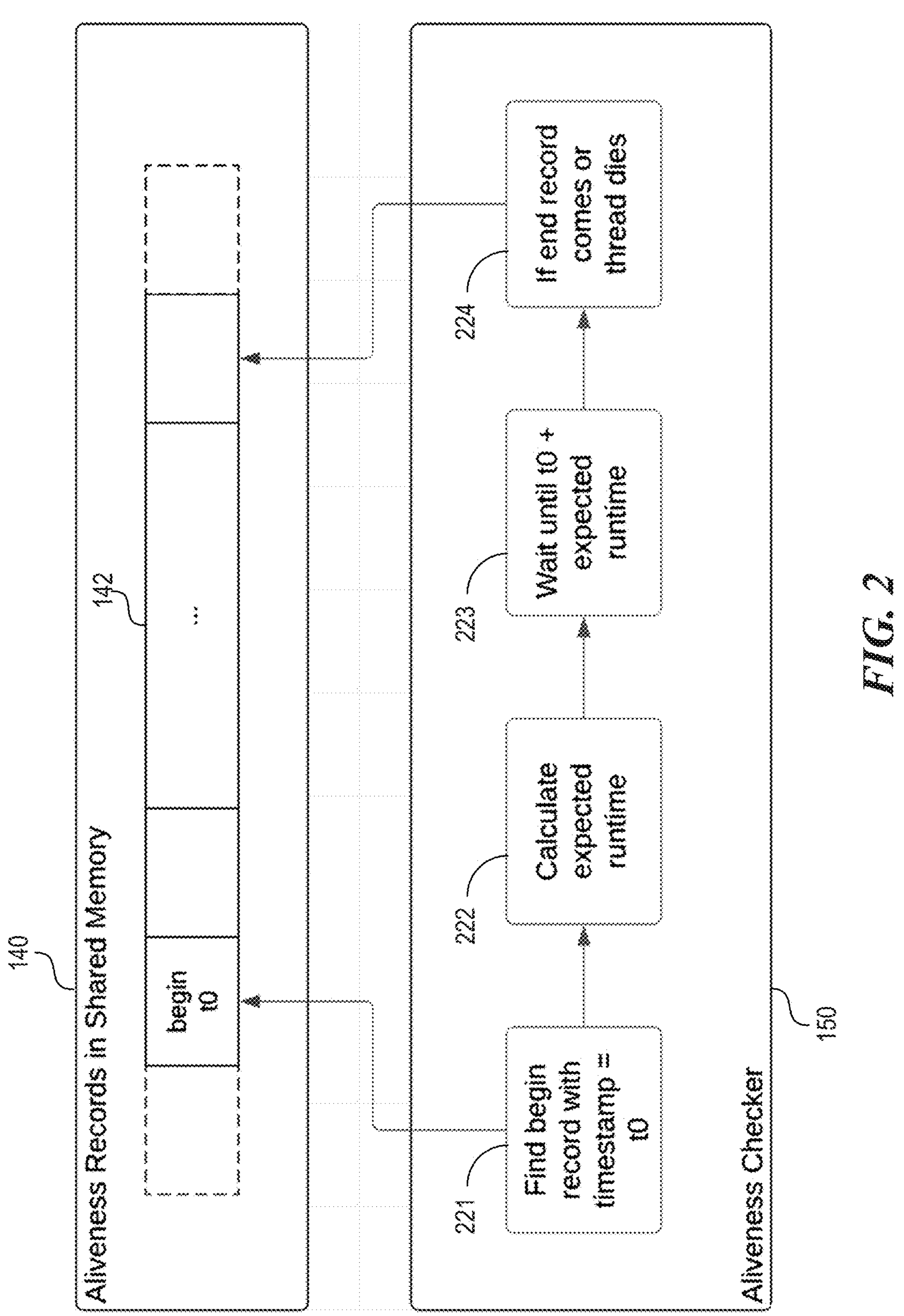
FIG. 2 shows an example of a schematic diagram of an aliveness record and an aliveness checker based on some implementations of the disclosed technology.

An aliveness checker 150 is configured to read the aliveness records stored in the shared memory 140. The aliveness checker 150 may include a scanning component 151 to read the aliveness records stored in the shared memory 140. FIG. 2 shows an example of a schematic diagram of an aliveness record and an aliveness checker based on some implementations of the disclosed technology. The aliveness checker 150 is configured to read the aliveness record 142 from the shared memory 140 and detect a callback with long runtime. Here, the long runtime may refer to the runtime greater than the expected runtime. In the implementation, the callback with the long runtime may suggest a suspicious status of a thread. In some implementations, the aliveness checker 150 may report the detected thread with the long runtime to other components/units for further processing/management of the error. In some implementations, the component/unit who receives the report from the aliveness checker regarding the detected thread with the long runtime can proceed to manage the reported thread as the dead thread by, for example, deallocating the resources used by the thread. In some implementations, the aliveness checker 150 can operate to determine the dead thread for the thread with the long runtime and proceed the further operation to manage the dead thread.

In some implementations, the aliveness checker 150 can apply various algorithms to detect the callback with long runtime. To detect the callback with the long runtime, the aliveness checker 150 may determine an expected runtime for a thread. In the implementations, if the runtime of the thread is greater than the expected runtime, such thread is determined to have the long runtime.

Referring to FIG. 2, at operation 221, the aliveness checker 150 finds a begin type aliveness record with timestamp t0. The aliveness checker 150 may find the begin type aliveness record using at least one of callback information such as an application name, function name, process ID, or thread ID. At operation 222, the aliveness checker 150 calculates the expected runtime for the callback associated with the aliveness record 142.

The expected runtime of the callback can be calculated in various manners including the two following implementations.

Implementation (1): The user configures a callback's expected runtime. In some implementations, the user presets the expected runtime for a thread. The expected runtime for each thread may be previously stored with the callback information such as an application name, function name, process ID, or thread ID. When a certain thread is being processed, the aliveness checker can read the corresponding expected runtime that is preconfigured.

Implementation (2): A circular buffer for each callback is provided to cache callback's recent runtimes. In this case, the shared memory 140 caching aliveness record 142 can be treated as a circular buffer and the middleware application keeps writing new records into this buffer and aliveness checker 150 keeps reading new versions of records from the shared memory 140.

Those two implementations are examples only and other implementations are possible without being limited thereto.

Figure 3:
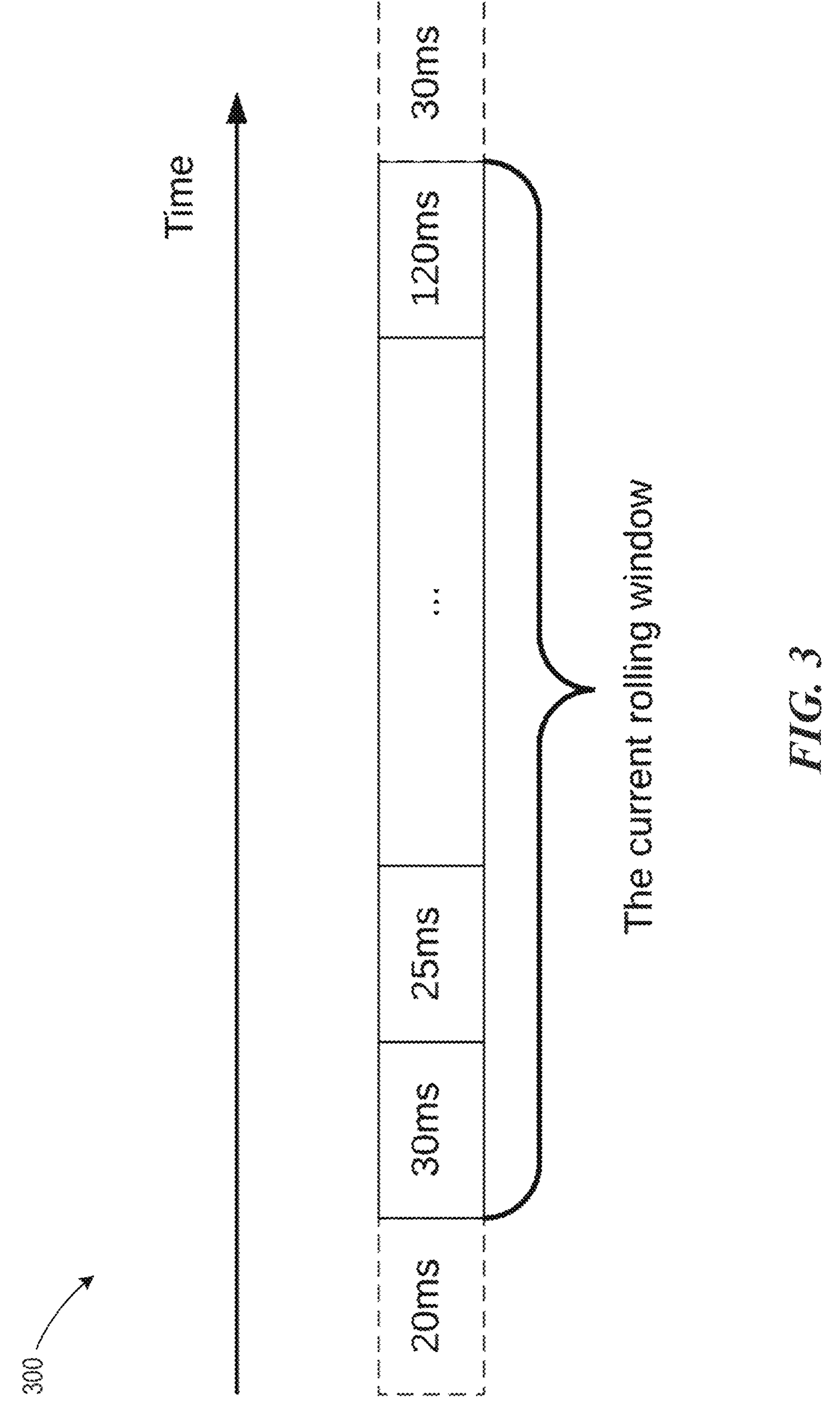
FIG. 3 shows an example of an expected runtime of a callback based on some implementations of the disclosed technology.

FIG. 3 shows an example of an expected runtime of a callback based on some implementations of the disclosed technology. In the example, the expected runtime of the callback can be calculated using a rolling-window analysis. The aliveness checker 150 may be implemented with a component to determine a rolling window size and estimate the model using each rolling window samples.

In the example, the expected runtime is calculated as follows:

Expected Runtime=rolling_mean+3*rolling_std.

The rolling_mean indicates mean of runtimes in a rolling window and rolling_std indicates the standard deviation of runtime in the rolling window. In the example, the aliveness checker 150 is capable of calculating the mean and standard deviation of runtimes in the rolling window. The equation for calculating the expected runtime above is the example only and other implementations are also possible. In some implementations, before there are enough records of runtimes, e.g., when the buffer is not full, a relatively large value can be used for the expected runtime to avoid false alarms.

The calculated expected runtime is used to determine the expected wakeup timepoint at which the aliveness checker wakes up to check if the callback's end record has come. Thus, after calculating the expected runtime for the callback associated with the aliveness record at operation 223, the aliveness checker 150 waits until the expected wakeup timepoint. In the example, the expected wakeup timepoint is obtained as a sum of the timestamp to and the calculated expected runtime. Then, at operation 224, the aliveness checker 150 wakes up to check if the callback's end record has come. If the callback's end record has not come until the expected wakeup timestamp, it indicates that the callback has not finished by the expected runtime. In this case, such a callback has the runtime greater than the expected runtime.

In some implementations, in response to the detecting that the callback's end record has not come within the expected wakeup timestamp, the aliveness checker 150 determines that a miss for the callback has occurred and increases the callback's 'miss count.' The miss count of one callback execution can be stored to be associated with the callback and used to indicate how abnormal the callback is. For example, the greater the miss count is, the more abnormal the callback is. In some implementations, the aliveness checker 150 may report the miss count information of threads to the error monitoring system 100 to allow the error monitoring system 100 can make additional determination for keeping the thread alive or terminate the thread based on various factors.

In some implementations, in response to detecting the thread with the long runtime greater than the expected runtime, the aliveness checker can determine the occurrence of the dead thread and can report it to the error monitoring system 100. In some implementations, the error monitoring system can allow the aliveness checker 150 to repeat checking the end record of the callback after the occurrence of the miss. In this case, in response to the detecting that the callback's end record has not come within the expected wakeup timestamp, the aliveness checker 150 calculates a new wakeup timestamp as the next checkpoint for the unfinished callback. In the example, the new wakeup timestamp may be determined as the timepoint that the calculated expected runtime passes from the previous wakeup timestamp, e.g., the sum of the previous wakeup timestamp and the calculated expected runtime. The calculated expected runtime may be same as one previously calculated for the callback.

In some implementations, the error monitoring system 100 can set a predetermined maximum number for the miss count. When the miscount becomes greater than the predetermined maximum number, the aliveness checker 150 can report such thread to the error monitoring system. The error monitoring system can provide various additional mechanisms for error handling, debugging, profiling, or others.

Referring back to FIG. 2, at operation 224, if the aliveness checker 150 finds an end type aliveness record, the aliveness checker 150 calculates its interval between the begin record and the end record. In some implementations, the aliveness checker 150 reports the large interval for the callback. In some implementations, the aliveness checker 150 skips reporting of the large interval because a callback is usually triggered by the upstream nodes' outputs. When the aliveness checker 150 skips reporting of the large interval of the callback, there may have other detectors, e.g., topic annotation, for the callback with the end type aliveness record.

In some implementations, the error monitoring system 100 may employ machine learning/artificial intelligence (AI) algorithms/applications that perform various types of data analysis to automate analytical model building. In some implementations, the machine learning/AI algorithms can operate with various servers/platforms operating as sources of various data that is related to the determining of the suspicious thread. Using the machine learning/AI algorithms that iteratively learn from data, machine learning applications can enable the signal processing module to learn without being explicitly programmed. The machine learning/AI algorithms/applications may be configured to use data learning algorithms to build models to interpret various data received from the various devices or components to detect, classify, and/or predict future outcomes. Such data learning algorithms may be associated with rule learning, artificial neural networks, inductive logic programming, and/or clustering.

The machine learning/AI algorithms/applications may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI algorithms/applications can abstract away and automate the low-level mechanics of AI, and the machine learning/AI algorithms/applications can manage and automate much of the lower-level complexities of working with AI. Each program developed in a pedagogical programming language can be fed into the machine learning/AI algorithms/applications to generate and train appropriate intelligence models. The machine learning/AI algorithms/applications can be a cloud-hosted platform configured to manage complexities inherent to training AI networks. Thus, the machine learning/AI algorithms/applications can be accessible with one or more client-side interfaces to allow third parties to submit a description of a problem in a pedagogical programming language and let the online AI engine build and generate a trained intelligence model for one or more of the third parties. In the implementations of the disclosed technology, the machine learning/AI algorithms/applications can process checking a health status of a thread to detect a suspicious thread.

Figure 4:
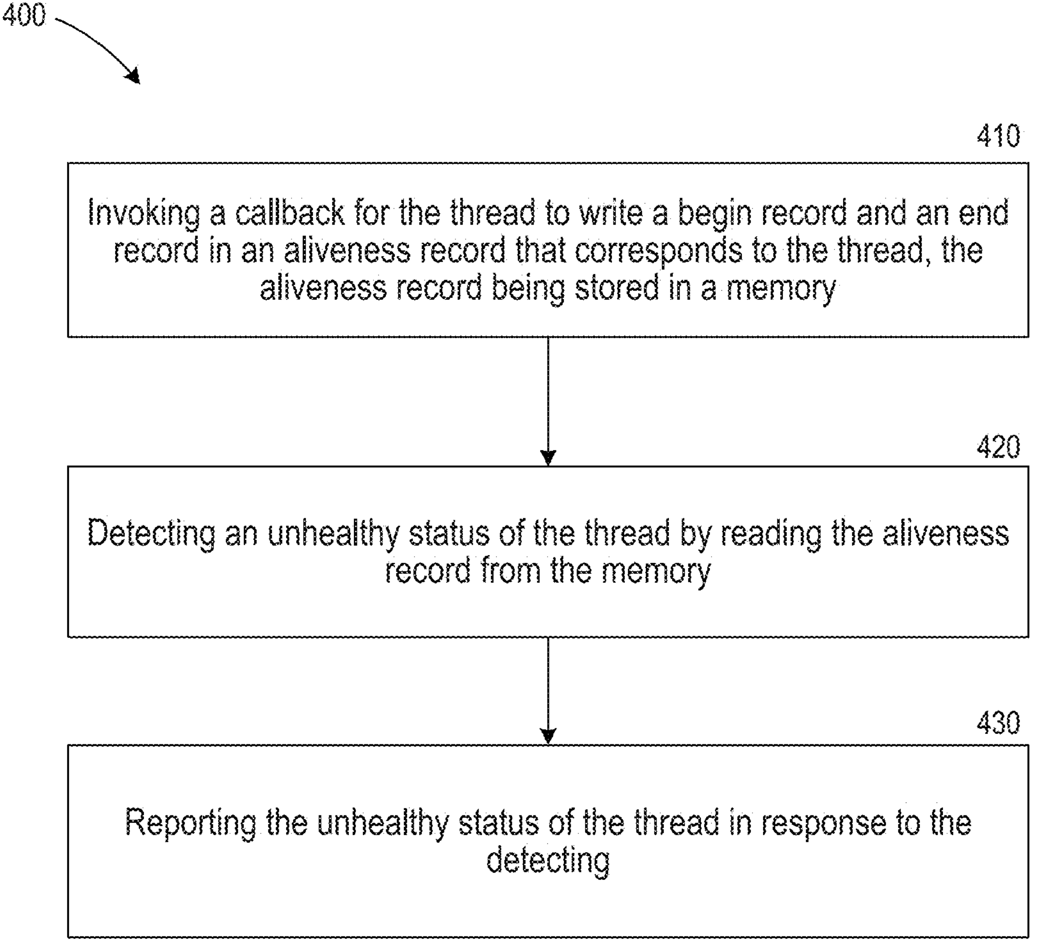
FIG. 4 shows an example of a flowchart of monitoring a health status of a thread based on some implementations of the disclosed technology.

FIG. 4 shows an example flowchart of a method 400 for monitoring a health status of a thread based on some implementations of the disclosed technology.

At operation 410, a callback is invoked for the thread to write a begin record and an end record in an aliveness record that corresponds to the thread. The aliveness record may be stored in a memory (for example, the shared memory 140 in FIG. 1) included in an error monitoring system. At operation 420, an unhealthy status of the thread is detected by reading the aliveness record from the memory. At operation 430, the unhealthy status of the thread is reported in response to the detecting.

In some implementations, the detecting the unhealthy status of the thread includes reading, from the memory, the begin record with a begin timestamp of the aliveness record; calculating an expected runtime for processing the thread; determining whether the end record comes within a target time determined based on the expected runtime. In some implementations, the detecting the unhealthy status of the thread detects the unhealthy status in case the end record does not come within the target time. In some implementations, the invoking the callback includes registering a pre-callback before an execution of the callback to write the begin record; and registering a post-callback after the execution of the callback to write the end record.

In some implementations, the method 400 further comprises: determining an occurrence of a miss event for the thread in case the end record does not come within the target time; and counting a number of miss events corresponding to the thread. In some implementations, the target time corresponds to a timepoint that passes from the begin timestamp by the expected runtime. In some implementations, the expected runtime is calculated as a moving average of previously measured completion times of the thread, which is offset by a standard deviation based on the previously measured completion times of the thread. In some implementations, reporting the unhealthy status of the thread includes generating an alert to notify the unhealthy status of the thread. The alert can be a visual alert, audio alert, or a combination of the visual and audio alerts.

In some implementations, the method 400 further comprises: receiving a test input for the thread, wherein the callback is configured to perform a fault injection in response to the receiving of the test input. In this case, the method can be used to perform fault injection and test robustness of an implementation by creating scenarios of failures of different processes/threads and impact of these failures on other processes and the overall software implementation.

In some implementations, a computer-readable storage medium having code stored thereon is provided. The code, upon execution by one or more processors, causes the one or more processors to implement a method comprising: invoking a callback for a thread to write a begin record and an end record in an aliveness record that corresponds to the thread, the aliveness record being stored in a memory; and detecting an unhealthy status of the thread by reading the aliveness record from the memory; and reporting the unhealthy status of the thread in response to the detecting. In some implementations, the detecting the unhealthy status of the thread includes reading, from the memory, the begin record with a begin timestamp of the aliveness record; calculating an expected runtime for processing the thread; and determining whether the end record comes within a target time determined based on the expected runtime. In some implementations, the one or more processors are installed in a vehicle.

In some implementations, a system of monitoring a health status of a thread is provided. The system comprises: a pre-callback register configured to register a pre-callback before an execution of a callback, wherein the pre-callback is configured to write a begin record in an aliveness record of the thread; a post-callback register configured to register a post-callback after the execution of the callback, wherein the post-callback is configured to write an end record for the thread; a memory storing an aliveness information for the thread that includes a begin timestamp and an end timestamp corresponding to the begin record and the end record, respectively; an aliveness record checker configured to read the aliveness record from the memory and detect an unhealthy status of the thread based on the aliveness record.

In some implementations, the aliveness record checker is configured to detect the unhealthy status of the thread in case a time period between the begin timestamp and a timepoint when the aliveness record checker reads the end timestamp is greater than an expected runtime of the thread. In some implementations, the expected runtime of the thread corresponds to a moving average of previously measured completion times of the thread, which is offset by a standard deviation based on the previously measured completion times of the thread. In some implementations, the aliveness record checker is further configured to determine an occurrence of a miss event for the thread in case the end record does not come within a target time determined based on the expected runtime.

In some implementations, the aliveness record checker is further configured to calculate another expected runtime and determine whether the end record comes within an updated target time that is updated based on the another expected runtime. In some implementations, the aliveness record checker is further configured to count a number of the occurrence of the miss event for the thread and report the number of the occurrence of the miss event. In some implementations, the pre-callback register and the post-callback register are configured to register the pre-callback and the post-callback via a pre-callback hook interface and a post-callback hook interface, respectively, the pre-callback hook interface and the post-callback hook interface provided by a middleware application. In some implementations, the aliveness record checker is further configured to generate an alert upon detecting the unhealthy status of the thread.

The error monitoring schemes as described in this patent document can be applied various systems which requires multi-thread real time executions. For example, the error monitoring schemes can be applied to semi-autonomous and autonomous vehicles to detect and report callbacks with long runtime or dead callback threads as early as possible so that a semi-autonomous or autonomous driving system can detect an error and provide a corresponding error handling to mitigate risks.

Figure 5:
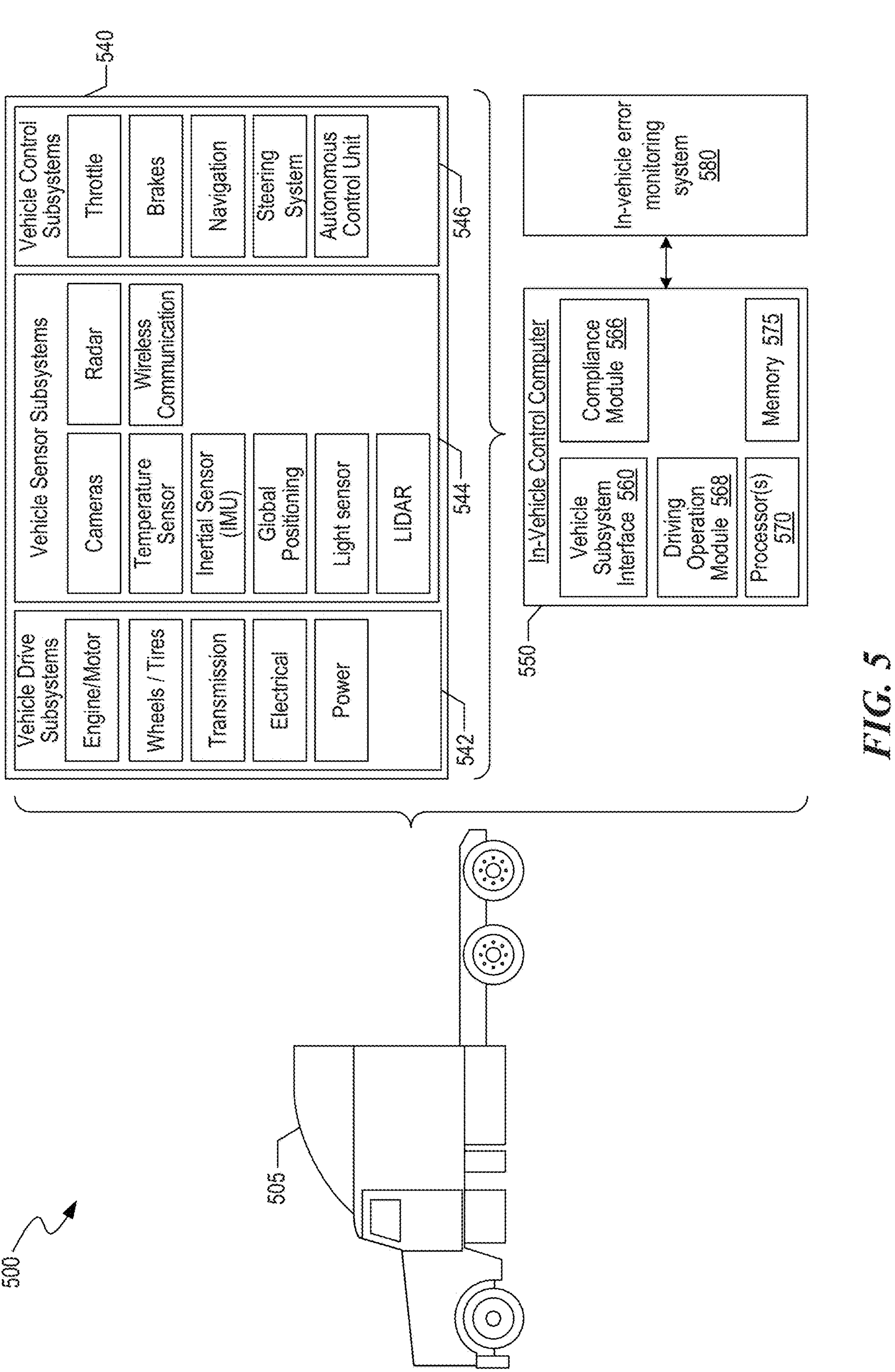
FIG. 5 shows an example of a system that is included an autonomous or semi-autonomous vehicle based on some implementations of the disclosed technology.

FIG. 5 shows a system 500 that includes an autonomous or semi-autonomous vehicle 505. While FIG. 5 shows the truck as the vehicle 505, other implementations are also possible. The vehicle 505 includes a plurality of vehicle subsystems 540 and an in-vehicle control computer 550. In the example as shown in FIG. 5, the in-vehicle control computer 550 with an in-vehicle error monitoring system 580 resident in the vehicle 505 can be configured such that the in-vehicle control computer 550 and the in-vehicle error monitoring system 580 can operate together to detect a suspicious thread and further manage the suspicious thread to mitigate the risk. The in-vehicle error monitoring system 580 may correspond to the error monitoring system 100 as shown in FIG. 1 and can be configured to perform operations/functions as described in FIGS. 2 to 4. As shown in FIG. 5, the plurality of vehicle subsystems 540 includes vehicle drive subsystems 542, vehicle sensor subsystems 544, and vehicle control subsystems 546. An engine or motor, wheels and tires, a transmission, an electrical subsystem, and a power subsystem may be included in the vehicle drive subsystems.

Vehicle sensor subsystems 544 can include sensors for the general operation of the vehicle 505, including those which would indicate a malfunction in the AV or another cause for an AV to perform a limited or minimal risk condition (MRC) maneuver. The sensors for general operation of the vehicle may include cameras, a temperature sensor, an inertial sensor (IMU), a global positioning system, a light sensor, a LIDAR system, a radar system, and wireless communications supporting network available in the vehicle 105. The in-vehicle control computer 550 can be configured to receive or transmit data from/to a wide-area network and network resources connected thereto.

A web-enabled device interface (not shown) can be included in the vehicle 505 and used by the in-vehicle control computer 550 to facilitate data communication between the in-vehicle control computer 550 and the network via one or more web-enabled devices. Similarly, a user mobile device interface can be included in the vehicle 505 and used by the in-vehicle control system to facilitate data communication between the in-vehicle control computer 550 and the network via one or more user mobile devices. The in-vehicle control computer 550 can obtain real-time access to network resources via network. The network resources can be used to obtain processing modules for execution by processor 570, data content to train internal neural networks, system parameters, or other data. In some implementations, the in-vehicle control computer 550 can include a vehicle subsystem interface (not shown) that supports communications from other components of the vehicle 505, such as the vehicle drive subsystems 542, the vehicle sensor subsystems 544, and the vehicle control subsystems 546.

The network resource may include any device, system, or service that can communicate with the in-vehicle control computer 550, the in-vehicle error monitoring system 580, and/or other subsystems to obtain read or write access to data signals, messages, or content communicated via any mode of inter-process or networked data communications. In some implementations, the network resource is a data network accessible computing platform, including client or server computers, websites, mobile devices, peer-to-peer (P2P) network nodes, or others. In some implementations, the network resource can be a web appliance, a network router, switch, bridge, gateway, diagnostics equipment, a system operated by a vehicle 505 manufacturer or service technician, or any machine capable of executing a set of instructions (sequential or otherwise) that specify actions to be taken by that machine. The network resources may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The vehicle control subsystems 546 may be configured to control operation of the vehicle 505 and its components. Accordingly, the vehicle control subsystems 546 may include various elements such as a throttle unit, a brake unit, a navigation unit, a steering system, and an autonomous control unit. The engine power output may control the operation of the engine, including the torque produced or horsepower provided, as well as provide control the gear selection of the transmission. The brake unit can include any combination of mechanisms configured to decelerate the vehicle 505. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 505. The navigation unit may additionally be configured to update the driving path dynamically while the vehicle 505 is in operation. In some embodiments, the navigation unit may be configured to incorporate data from the GPS device and one or more predetermined maps so as to determine the driving path for the vehicle 505. The steering system may represent any combination of mechanisms that may be operable to adjust the heading of vehicle 505 in an autonomous mode or in a driver-controlled mode.

The autonomous control unit may represent a control system configured to identify, evaluate, and avoid or otherwise negotiate potential obstacles in the environment of the vehicle 505. In general, the autonomous control unit may be configured to control the vehicle 505 for operation without a driver or to provide driver assistance in controlling the vehicle 505. In some embodiments, the autonomous control unit may be configured to incorporate data from the GPS device, the RADAR, the LiDAR (also referred to as LIDAR), the cameras, and/or other vehicle subsystems to determine the driving path or trajectory for the vehicle 505. The autonomous control unit may activate systems to allow the vehicle to communicate with surrounding drivers or signal surrounding vehicles or drivers for safe operation of the vehicle.

An in-vehicle control computer 550, which may be referred to as a VCU, includes a vehicle subsystem interface 1600, a driving operation module 1680, one or more processors 1700, a compliance module 1660, a memory 1750, and a network communications subsystem (not shown). In some implementations, the in-vehicle control computer 550 may further include the transceiver, the control module, the database, I/O interfaces. The in-vehicle control computer 550 controls many, if not all, of the operations of the vehicle 505 in response to information from the various vehicle subsystems 540. The one or more processors 570 execute the operations that allow the system to determine the health of the AV, such as whether the AV has a malfunction or has encountered a situation requiring service or a deviation from normal operation and giving instructions. Data from the vehicle sensor subsystems 544 is provided to in-vehicle control computer 550 so that the determination of the status of the AV can be made. The compliance module 566 determines what action needs to be taken by the vehicle 505 to operate according to the applicable (i.e., local) regulations. Data from other vehicle sensor subsystems 544 may be provided to the compliance module 566 so that the best course of action in light of the AV's status may be appropriately determined and performed. Alternatively, or additionally, the compliance module 566 may determine the course of action in conjunction with another operational or control module, such as the driving operation module 568.

The memory 575 may contain additional instructions as well, including instructions to transmit data to, receive data from, interact with, or control one or more of the vehicle drive subsystems 542, the vehicle sensor subsystems 544, and the vehicle control subsystems 546 including the autonomous control unit. The in-vehicle control computer 550 may control the function of the vehicle 505 based on inputs received from various vehicle subsystems (e.g., the vehicle drive subsystems 542, the vehicle sensor subsystems 544, and the vehicle control subsystems 546). Additionally, the in-vehicle control computer 550 may send information to the vehicle control subsystems 546 to direct the trajectory, velocity, signaling behaviors, and the like, of the vehicle 505. The autonomous control vehicle control subsystem may receive a course of action to be taken from the compliance module 566 of the in-vehicle control computer 550 and consequently relay instructions to other subsystems to execute the course of action.

The in-vehicle error monitoring system 580 operate together with the in-vehicle control computer 550 to monitor a health status of a thread. Although it is shown in FIG. 5 that the in-vehicle error monitoring system 580 is configured separately from the in-vehicle control computer 550, the in-vehicle error monitoring system 580 can be configured as the component in the in-vehicle control computer 550. In some implementations, the in-vehicle control computer 550 and the in-vehicle error monitoring system 580 in data communication therewith can be implemented as integrated components or as separate components. In an example embodiment, the software components of the in-vehicle control computer 550 and/or the in-vehicle error monitoring system 580 can be dynamically upgraded, modified, and/or augmented by use of the data connection with the mobile devices and/or the network resources via network. For example, the algorithm to calculate the expected runtime can be dynamically upgraded, modified, and/or augmented. In the example, the callback information corresponding to a certain callback can be dynamically upgraded, modified, and/or augmented. In some implementations, the in-vehicle control computer 550 and the in-vehicle error monitoring system 580 can periodically query a mobile device or a network resource for updates or updates can be pushed to the in-vehicle control computer 550 and the in-vehicle error monitoring system 580.

In some implementations, a mobile device and/or a network resource may act as a client device enabling a user to access the in-vehicle control computer 550 and/or the in-vehicle error monitoring system 580 to interact with one or more components of a vehicle subsystem. These client devices may include virtually any computing device that is configured to send and receive information over a network. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and or others, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

In some implementations, the in-vehicle error monitoring system 580 can be configured in any of the vehicle driving subsystems 542, the vehicle sensor subsystems 544, or the vehicle control subsystems 546 to monitor health statuses of threads in corresponding subsystems. As described with reference to FIG. 1, the in-vehicle error monitoring system 580 may has components corresponding to the error management middleware application including the hook interface and the callback register, the shared memory, and the aliveness checker. The in-vehicle error monitoring system 580 can be in communication with the vehicle subsystems 540 and the in-vehicle control computer 550 and operate as a middleware application for processes and threads processed by the in-vehicle error monitoring system 580 and the in-vehicle control computer 550.

While FIG. 5 shows the example that the in-vehicle error monitoring system 580 is provided in the vehicle, other implementations are also possible. For example, the error monitoring system is provided in an external server that is provided outside of the vehicle. In this case, the error monitoring system operates to perform the operations/functions as described in FIGS. 1 to 4 via the real time communications.

While it has been described that the error monitoring system is incorporated in a vehicle, other implementations are possible. For example, the error monitoring system can be utilized in any multi-threaded real-time system such as web-client browsers, network servers, etc. It will be apparent to those of ordinary skill in the art that the in-vehicle error monitoring system 580 described herein can be implemented, configured, and used in a variety of other applications and systems as well.

Figure 6:
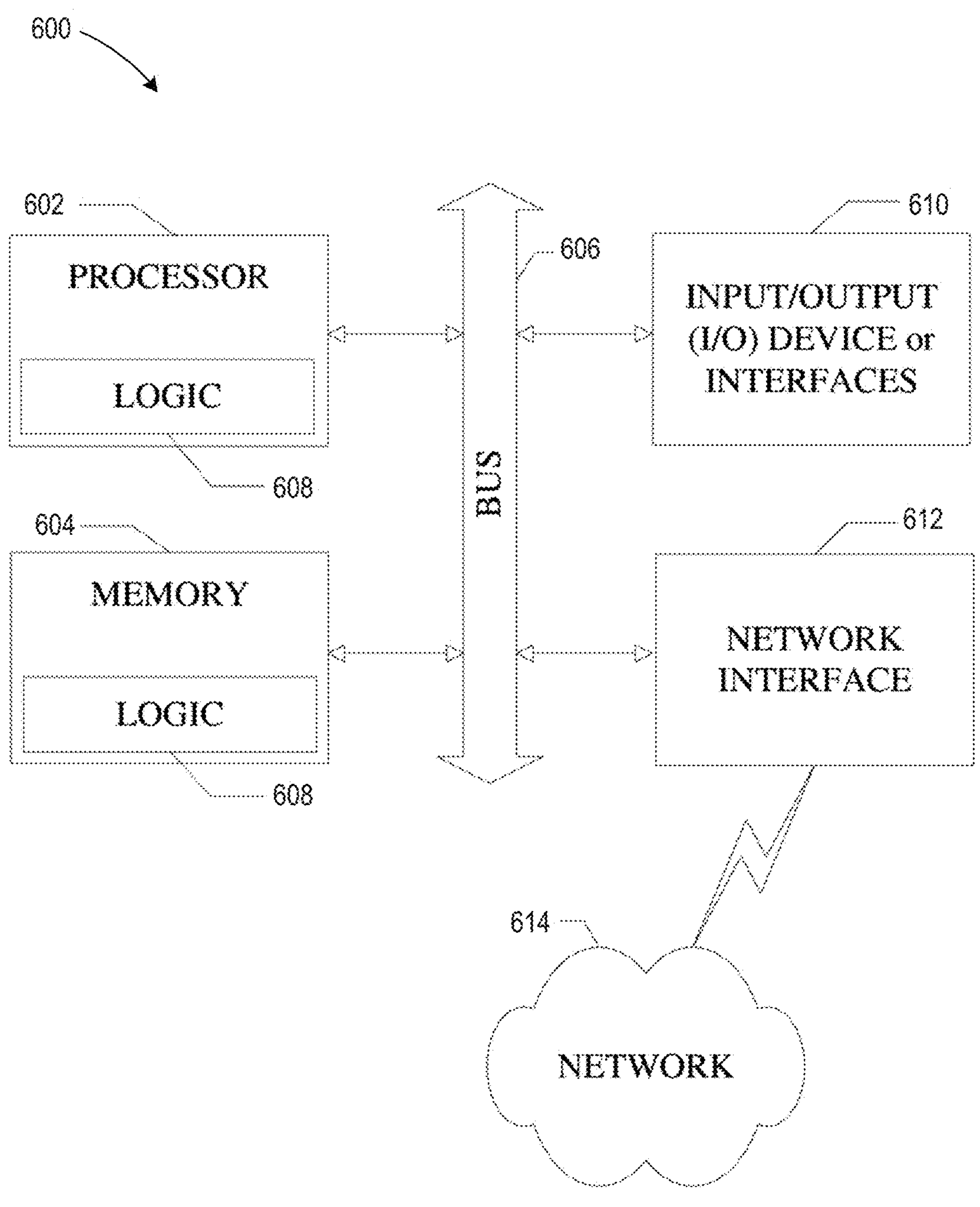
FIG. 6 shows an example of a machine in a computing system based on some implementations of the disclosed technology.

FIG. 6 shows a diagrammatic representation of a machine in the example form of a computing system 600 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the machine can include any collection of machines that individually or jointly execute a set (or multiple sets) of instructions or processing logic to perform any one or more of the methodologies described and/or claimed herein.

The example computing system 600 can include a data processor 602 (e.g., a System-on-a-Chip (SoC), general processing core, graphics core, and optionally other processing logic) and a memory 604, which can communicate with each other via a bus or other data transfer system 606. The mobile computing and/or communication system 600 may further include various input/output (I/O) devices and/or interfaces 610, such as a touchscreen display, an audio jack, a voice interface, and optionally a network interface 612. In an example embodiment, the network interface 612 can include one or more radio transceivers configured for compatibility with any one or more standard wireless and/or communication protocols. Network interface 612 may also be configured for use with various other wired and/or wireless communication. The network interface 612 may include or support virtually any wired and/or wireless communication and data processing mechanisms by which information/data may travel between a computing system 600 and another computing or communication system via network 614.

The memory 604 can represent a machine-readable medium on which is stored one or more sets of instructions, software, firmware, or other processing logic (e.g., logic 608) embodying any one or more of the methodologies or functions described and/or claimed herein. The logic 608, or a portion thereof, may also reside, completely or at least partially within the processor 602 during execution thereof by the mobile computing and/or communication system 600. As such, the memory 604 and the processor 602 may also constitute machine-readable media. The logic 608, or a portion thereof, may also be configured as processing logic or logic, at least a portion of which is partially implemented in hardware. The logic 608, or a portion thereof, may further be transmitted or received over network 614 via the network interface 612.

While the machine-readable medium of an example embodiment can be a single medium, the term, machine-readable medium, can be taken to include a single non-transitory medium or multiple non-transitory media (e.g., a centralized or distributed database, and/or associated caches and computing systems) that store the one or more sets of instructions. The machine-readable medium can also include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The machine-readable medium can accordingly include, but not be limited to, solid-state memories, optical media, and magnetic media.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database monitoring system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. In some implementations, however, a computer may not need such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of monitoring a health status of a thread, comprising:

invoking a callback for the thread to write a begin record and an end record in an aliveness record that corresponds to the thread, the aliveness record being stored in a memory;

detecting an unhealthy status of the thread by reading the aliveness record from the memory; and reporting the unhealthy status of the thread in response to the detecting;

wherein the method further comprises:

receiving a test input for the thread, wherein the callback is configured to perform a fault injection in response to the receiving of the test input.

2. The method of claim 1, wherein the detecting the unhealthy status of the thread includes:

reading, from the memory, the begin record with a begin timestamp of the aliveness record;

calculating an expected runtime for processing the thread; and determining whether the end record comes within a target time determined based on the expected runtime.

3. The method of claim 2, wherein the detecting the unhealthy status of the thread detects the unhealthy status in case the end record does not come within the target time.

4. The method of claim 2, further comprising:

determining an occurrence of a miss event for the thread in case the end record does not come within the target time; and counting a number of miss events corresponding to the thread.

5. The method of claim 2, wherein the target time is the begin timestamp plus the expected runtime.

6. The method of claim 2, wherein the expected runtime is calculated as a moving average of previously measured completion times of the thread, which is offset by a standard deviation based on the previously measured completion times of the thread.

7. The method of claim 1, wherein the reporting the unhealthy status of the thread includes:

generating an alert to notify the unhealthy status of the thread.

8. The method of claim 1, wherein the invoking the callback includes:

registering a pre-callback before an execution of the callback to write the begin record; and registering a post-callback after the execution of the callback to write the end record.

9. A system of monitoring a health status of a thread, comprising:

a pre-callback register configured to register a pre-callback before an execution of a callback, wherein the pre-callback is configured to write a begin record in an aliveness record of the thread;

a post-callback register configured to register a post-callback after the execution of the callback, wherein the post-callback is configured to write an end record for the thread;

a memory storing an aliveness information for the thread that includes a begin timestamp and an end timestamp corresponding to the begin record and the end record, respectively; and an aliveness record checker configured to read the aliveness record from the memory and detect an unhealthy status of the thread based on the aliveness record;

wherein the system is further configured to receive a test input for the thread, and the callback is configured to perform a fault injection in response to the receiving of the test input.

10. The system of claim 9, wherein the aliveness record checker is configured to detect the unhealthy status of the thread in response to that a time period between the begin timestamp and a timepoint when the aliveness record checker reads the end timestamp is greater than an expected runtime of the thread.

11. The system of claim 10, wherein the expected runtime of the thread corresponds to a moving average of previously measured completion times of the thread, which is offset by a standard deviation based on the previously measured completion times of the thread.

12. The system of claim 10, wherein the aliveness record checker is further configured to determine an occurrence of a miss event for the thread in case the end record does not come within a target time determined based on the expected runtime.

13. The system of claim 12, wherein the aliveness record checker is further configured to calculate another expected runtime and determine whether the end record comes within an updated target time that is updated based on the another expected runtime.

14. The system of claim 12, wherein the aliveness record checker is further configured to count a number of the occurrence of the miss event for the thread and report the number of the occurrence of the miss event.

15. The system of claim 9, wherein the pre-callback register and the post-callback register are configured to register the pre-callback and the post-callback via a pre-callback hook interface and a post-callback hook interface, respectively, the pre-callback hook interface and the post-callback hook interface provided by a middleware application.

16. The system of claim 9, wherein the aliveness record checker is further configured to generate an alert upon detecting the unhealthy status of the thread.

17. A non-transitory computer-readable storage medium having code stored thereon, the code, upon execution by one or more processors, causing the one or more processors to implement a method comprising:

invoking a callback for a thread to write a begin record and an end record in an aliveness record that corresponds to the thread, the aliveness record being stored in a memory;

detecting an unhealthy status of the thread by reading the aliveness record from the memory; and reporting the unhealthy status of the thread in response to the detecting;

wherein the method further comprises:

receiving a test input for the thread, wherein the callback is configured to perform a fault injection in response to the receiving of the test input.

18. The non-transitory computer-readable storage medium of claim 17, wherein the detecting the unhealthy status of the thread includes:

reading, from the memory, the begin record with a begin timestamp of the aliveness record;

calculating an expected runtime for processing the thread; and determining whether the end record comes within a target time determined based on the expected runtime.

19. The non-transitory computer-readable storage medium of claim 17, wherein the one or more processors are installed in a vehicle.

* * * * *